US008265598B2

(12) United States Patent
Kim et al.

(10) Patent No.: US 8,265,598 B2
(45) Date of Patent: Sep. 11, 2012

(54) METHOD OF SHARING INFORMATION IN MOBILE TERMINAL USING LOCAL WIRELESS COMMUNICATION

(75) Inventors: Hee Woon Kim, Seoul (KR); Kyoung Taek Kim, Seongnam-si (KR); Jung Hwa Shim, Seoul (KR); Byeong Cheol Hwang, Seoul (KR)

(73) Assignee: Samsung Electronics Co., Ltd (KR)

( * ) Notice: Subject to any disclaimer, the term of this patent is extended or adjusted under 35 U.S.C. 154(b) by 1461 days.

(21) Appl. No.: 11/776,355

(22) Filed: Jul. 11, 2007

(65) Prior Publication Data

US 2008/0045189 A1 Feb. 21, 2008

(30) Foreign Application Priority Data

Aug. 18, 2006 (KR) .................. 10-2006-0078281

(51) Int. Cl.
*H04M 1/66* (2006.01)
(52) U.S. Cl. ................. 455/411; 455/414.1; 455/412.1; 455/41.2; 455/557; 455/3.01; 709/216; 709/202; 709/213; 707/8; 707/9; 707/10
(58) Field of Classification Search .......... 455/414.411, 455/517–519; 709/216; 726/27–30; 707/8–10
See application file for complete search history.

(56) References Cited

U.S. PATENT DOCUMENTS

| 5,519,861 | A | * | 5/1996 | Ryu et al. ................. 1/1 |
| 6,091,946 | A | * | 7/2000 | Ahvenainen ........... 455/411 |
| 6,240,518 | B1 | * | 5/2001 | Ooki et al. ................. 726/4 |
| 6,578,081 | B1 | | 6/2003 | Tominaga et al. |
| 7,191,195 | B2 | * | 3/2007 | Koyama et al. ............. 1/1 |
| 7,546,299 | B2 | * | 6/2009 | Benco et al. ............... 1/1 |
| 8,132,261 | B1 | * | 3/2012 | Simpson et al. ........ 726/27 |
| 2002/0062367 | A1 | * | 5/2002 | Debber et al. ........ 709/224 |
| 2002/0184318 | A1 | * | 12/2002 | Pineau ................ 709/206 |

(Continued)

FOREIGN PATENT DOCUMENTS

DE 101 49 496 10/2001

(Continued)

OTHER PUBLICATIONS

"Digital Rights Mangament Version 1,0" Announcement Open Mobile Alliance, Sep. 5, 2002.

*Primary Examiner* — Rafael Pérez-Gutiérrez
*Assistant Examiner* — Lameka J. Kirk
(74) *Attorney, Agent, or Firm* — The Farrell Law Firm, P.C.

(57) ABSTRACT

A method of sharing information between mobile terminals using a local wireless communication network is disclosed. The method includes setting information stored in a first mobile terminal with one of at least two security levels; if registration is requested by a second mobile terminal, registering an identifier of the second mobile terminal and an access rights level of the second mobile terminal to the information set with a security level; if a local wireless communication link is formed with the second mobile terminal, displaying a list of information set with a set security level corresponding to the access rights level of the second mobile terminal; and sharing the displayed information according to a request from the second mobile terminal. According to the present invention, information stored in a mobile terminal may safely be shared with another mobile terminal in a local wireless communication area.

18 Claims, 6 Drawing Sheets

U.S. PATENT DOCUMENTS

| | | | |
|---|---|---|---|
| 2003/0083086 A1* | 5/2003 | Toyryla et al. | 455/518 |
| 2003/0097464 A1* | 5/2003 | Martinez et al. | 709/238 |
| 2003/0101200 A1* | 5/2003 | Koyama et al. | 707/200 |
| 2004/0009750 A1 | 1/2004 | Beros et al. | |
| 2005/0021780 A1 | 1/2005 | Beyda | |
| 2005/0081159 A1* | 4/2005 | Gupta et al. | 715/751 |
| 2005/0117642 A1* | 6/2005 | Abe et al. | 375/240.12 |
| 2005/0181730 A1* | 8/2005 | Yamada et al. | 455/62 |
| 2005/0232242 A1* | 10/2005 | Karaoguz et al. | 370/352 |
| 2006/0036554 A1* | 2/2006 | Schrock et al. | 705/75 |
| 2006/0042483 A1* | 3/2006 | Work et al. | 101/91 |
| 2007/0105577 A1* | 5/2007 | Bonta et al. | 455/517 |

FOREIGN PATENT DOCUMENTS

| | | |
|---|---|---|
| KR | 1020040041219 | 5/2004 |
| KR | 1020060072770 | 6/2006 |
| WO | WO 2006/056881 | 6/2006 |

* cited by examiner

METHOD OF SHARING INFORMATION IN MOBILE TERMINAL USING LOCAL WIRELESS COMMUNICATION

PRIORITY

This application claims priority to an application entitled "METHOD OF SHARING INFORMATION IN MOBILE TERMINAL USING LOCAL WIRELESS COMMUNICATION" filed in the Korean Intellectual Property Office on Aug. 18, 2006 and assigned Serial No. 2006-0078281, the contents of which is incorporated herein by reference.

BACKGROUND OF THE INVENTION

1. Field of the Invention

The present invention relates to a method of sharing information in a mobile terminal, and more particularly, to a method of sharing information stored in a mobile terminal with another mobile terminal located in a local wireless communication area.

2. Description of the Prior Art

Recently, many people have opened their private lives to the public through Internet blogs (for example, Cyworld and Myspace), and a new compound word, 'publizen' (public+ citizen) meaning "a person who enjoys disclosing their private life to the public", has appeared. Mobile terminal technology is rapidly developing to provide user convenience, such as easily editing a photograph and a moving picture, uploading the edited photograph and moving picture in real time with little restriction to location, and enjoying Internet blogs and communities by using the mobile terminal. Additionally, various Internet media are being developed to provide self-introduction and pleasure-sharing with another person by transmitting to another mobile terminal data related to a private life, such as one's own photograph and moving picture.

SUMMARY OF THE INVENTION

However, the conventional method of sharing information does not provide a function for controlling a connection to a mobile terminal and a function for controlling information-sharing by setting a security level of information. Therefore, private information may be disclosed to an unintended person.

The present invention has been made in view of at least the above problems, and provides a method of connecting to a mobile terminal using a local wireless communication network.

The present invention further provides a method of controlling access from a mobile terminal by setting an access rights level of the mobile terminal.

The present invention further provides a method of controlling access to information stored in a mobile terminal by setting a security level of the information.

The present invention further provides a method of controlling an access right of a mobile terminal by setting an access rights level of the mobile terminal and by setting a security level of information stored in another mobile terminal to facilitate the sharing of information.

According to an exemplary embodiment of the present invention, a method of sharing information in a mobile terminal includes setting information stored in a first mobile terminal with one of at least two security levels; if registration is requested by a second mobile terminal, registering an identifier of the second mobile terminal and an access rights level of the second mobile terminal to the information set with a security level; if a local wireless communication link is formed with the second mobile terminal, displaying a list of information set with a set security level corresponding to the access rights level of the second mobile terminal; and sharing the displayed information according to a request from the second mobile terminal.

BRIEF DESCRIPTION OF THE DRAWINGS

The objects, features and advantages of the present invention will become more apparent from the following detailed description in conjunction with the accompanying drawings, in which.

DETAILED DESCRIPTION OF EXEMPLARY EMBODIMENTS

Hereinafter, exemplary embodiments of the present invention are described in detail with reference to the accompanying drawings. The same reference numbers are used throughout the drawings. Detailed descriptions of constructions or processes known in the art may be omitted to avoid obscuring the subject matters of the present invention.

In the exemplary embodiments of the present invention, Bluetooth® communication is described as an example of the local wireless communication. However, the local wireless communication may be another local wireless communication system, such as IrDA (Infrared Data Association), Zigbee, UWB (Ultra-WideBand), and NFC (Near-Field Communication). Additionally, 'first mobile terminal' means a master mobile terminal having stored information and providing the information to another mobile terminal during a Bluetooth® communication. 'Second mobile terminal' means a slave mobile terminal requesting to share the information stored in the first mobile terminal. Further, 'information' includes moving image data, still image data, multimedia data including music, and character data.

Figure 1:
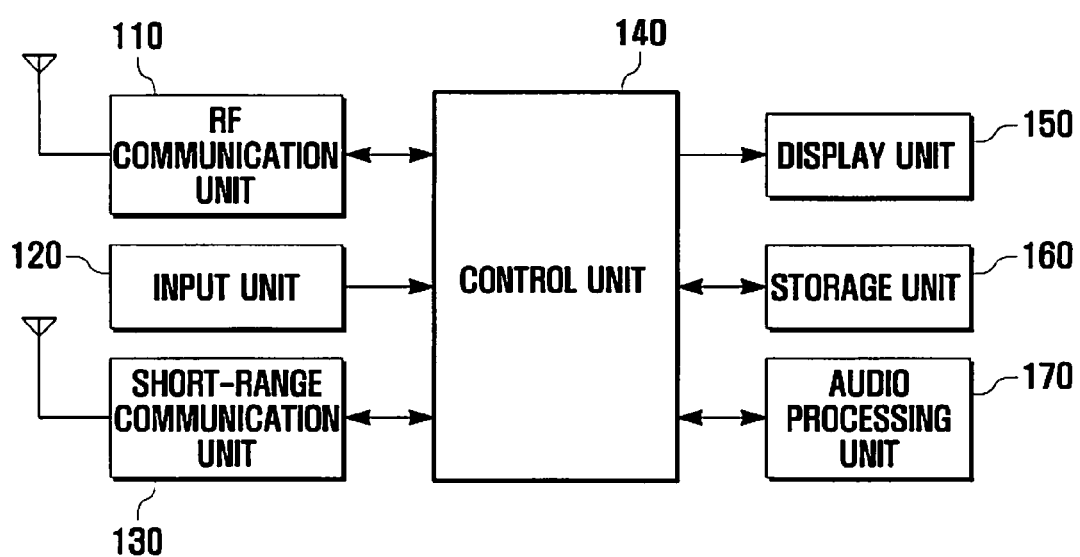
FIG. 1 is a block diagram of a mobile terminal for sharing information according to an exemplary embodiment of the present invention.

FIG. 1 is a block diagram of a mobile terminal for sharing information according to an exemplary embodiment of the present invention.

Referring to FIG. 1, the mobile terminal includes an RF (Radio Frequency) communication unit 110, input unit 120, short-range communication unit 130, control unit 140, display unit 150, storage unit 160, and audio processing unit 170.

The RF communication unit 110 performs general radio communication between the mobile terminal and a mobile communication network. That is, the RF communication unit 110 transmits and receives voice, character messages, and multimedia messages, through a wireless communication network.

The input unit 120 is configured with a conventional keypad. Alternatively, the input unit 120 may be configured with a touch screen, touch pad, or scroll wheel. The input unit 120 receives a signal for operating the mobile terminal and outputs the signal to the control unit 140.

The short-range communication unit 130, in this exemplary embodiment transmits and receives information to and from other mobile terminals located in a local wireless communication area.

The short-range communication unit 130 is a Bluetooth® module that performs a communication function with another Bluetooth® enabled device through an antenna by using a protocol. In particular, the short-range communication unit 130 stores a host stack in charge of Bluetooth® communication, and applications and Bluetooth® profiles selected corresponding to a function and a condition of another Bluetooth® enabled device. Further, the Bluetooth® profiles include an OPP (Object Push Profile) required for exchanging an object and for transmitting a file.

The control unit 140 controls the general operation of internal units of the mobile terminal. In particular, the control unit 140 includes a modem and a codec having a transmitter for encoding and modulating a signal to be transmitted through the RF communication unit 110, and a receiver for demodulating and decoding a signal received through the RF communication unit 110.

The display unit 150 displays an operation status of the internal units of the mobile terminal and various data according to the control of the control unit 140. The display unit 150 may be configured with a display device such as an LCD (Liquid Crystal Display), OLED (Organic Light Emitting Diodes), or PDP (Plasma Display Panel).

The storage unit 160 stores information related to the operation of the mobile terminal (for example, settings and menus) according to the control of the control unit 140.

The audio processing unit 170 converts an audio signal received from a microphone (not shown) to a digital signal and outputs the digital signal to the control unit 140. Additionally, the audio processing unit 170 converts a digital signal received from the control unit 140 to an analog signal and outputs the analog signal through a speaker (not shown).

Figure 2:
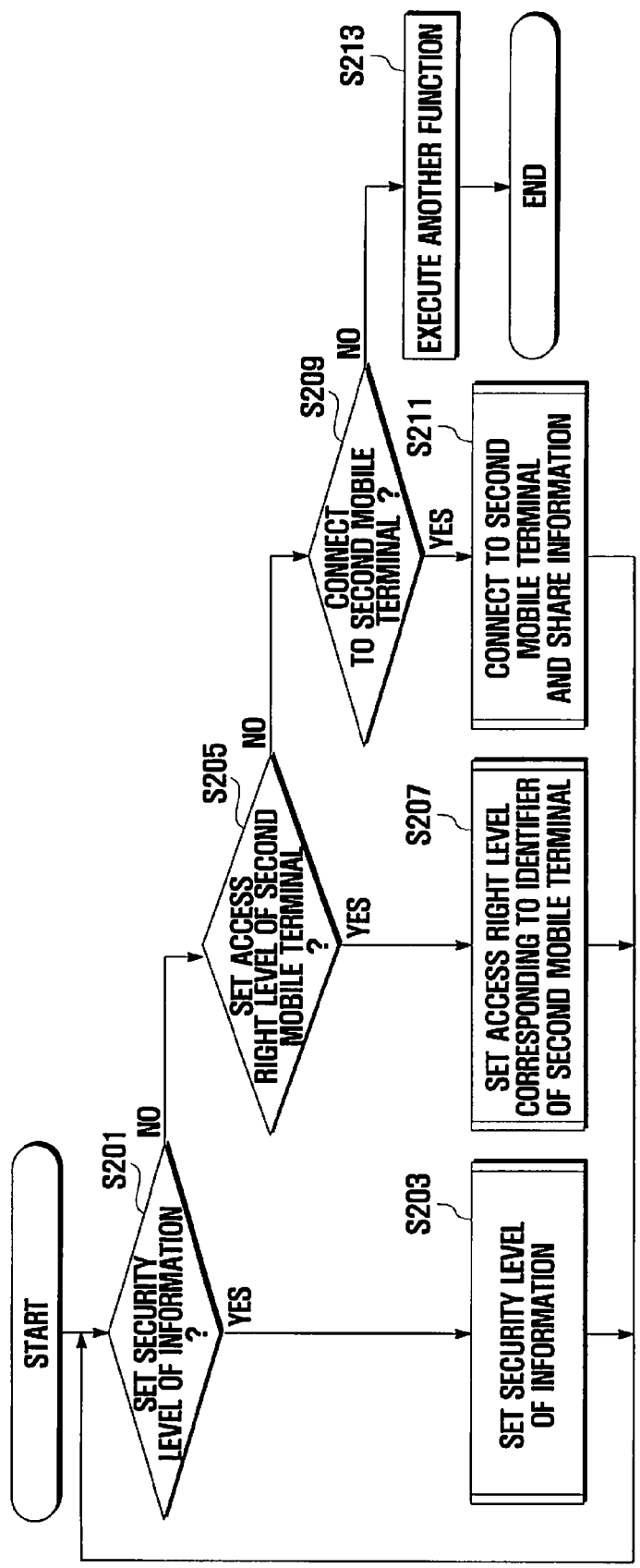
FIG. 2 is a flow chart of a method of sharing information in a mobile terminal according to an exemplary embodiment of the present invention.

FIG. 2 is a flow chart of a method of sharing information in a mobile terminal according to an exemplary embodiment of the present invention.

Referring to FIG. 2, the control unit 140 of a first mobile terminal identifies if the setting a security level of information is requested in step S201. If setting a security level of information is requested, the control unit 140 sets and stores in step S203 a security level of information stored in the first mobile terminal, then returns to step S201. The information may include a folder and a file stored in the first mobile terminal. The folder may further include a sub-folder.

If setting a security level of information is not requested at step S201, the control unit 140 of the first mobile terminal identifies if the setting an access rights level of a second mobile terminal located in a Bluetooth® network area is requested in step S205. If setting an access rights level of the second mobile terminal is requested, the control unit 140 sets and stores in step S207 an identifier of the second mobile terminal as an access rights level of the second mobile terminal, then returns to step S201. In Bluetooth® communication, a pin code of the second mobile terminal may be used as the identifier. If setting an access rights level of the second mobile terminal is not requested at step S205, the control unit 140 of the first mobile terminal identifies in step S209 if the wireless connection to the second mobile terminal is requested. If the wireless connection to the second mobile terminal is requested, the control unit 140 forms a Bluetooth® communication link with the second mobile terminal, and shares information and adds a comment in step S211.

If the wireless connection to the second mobile terminal is not requested at step S209, the control unit 140 executes another function of the first mobile terminal in step S213 and terminates the process.

Figure 3:
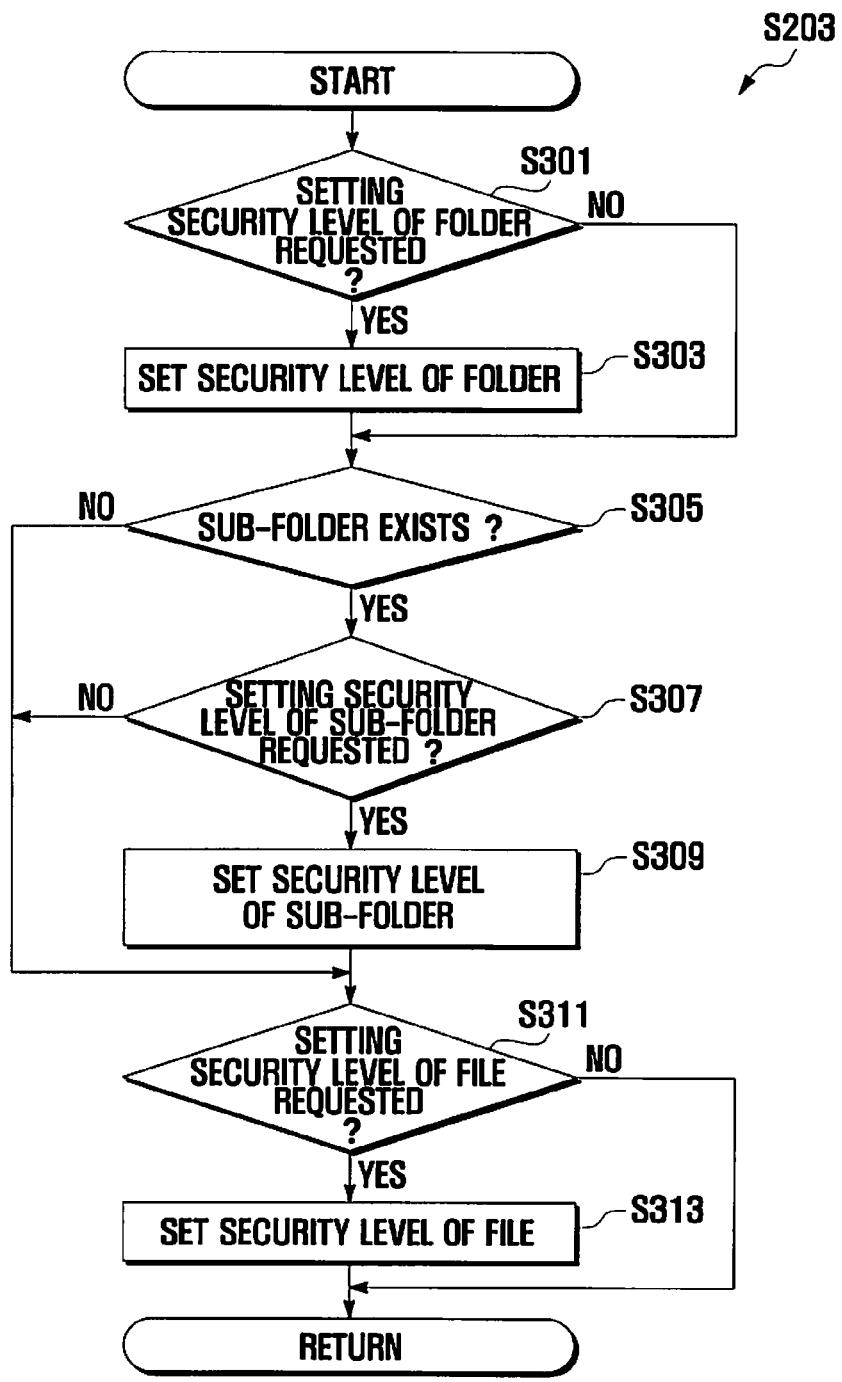
FIG. 3 is a flow chart of a detailed process of setting a security level of information in the method of sharing information of FIG. 2.

FIG. 3 is a flow chart showing a detailed process of setting a security level of information stored in a first mobile terminal at step S203 of FIG. 2.

Referring to FIG. 3, the control unit 140 of the first mobile terminal identifies if the setting a security level of a folder is requested in step S301. If the setting of a security level of a folder is requested, the control unit 140 sets in step S303 a security level for a folder stored in the first mobile terminal. If setting a security level of a folder is not requested, the process continues at step S305.

The control unit 140 of the first mobile terminal identifies in step S305 if a sub-folder exists. If a sub-folder exists, the control unit 140 identifies in step S307 if the setting of a security level of the sub-folder is requested. If the setting of a security level of the sub-folder is requested, the control unit 140 sets in step S309 a security level of the sub-folder.

If a sub-folder does not exist at step S305 or if the setting of a security level of the sub-folder is not requested at step S307, the process continues at step S311.

The control unit 140 identifies in step S311 if the setting of a security level of a file is requested. If the setting of a security level of a file is requested, the control unit 140 sets a security level of the file in step S313, then returns to step S201 of FIG. 2.

If the setting of a security level of a file is not requested at step S311, the process returns to step S201 of FIG. 2. For example, two photographs A and B may be set as 'security level 1' and 'security level 2' respectively, without setting a security level of a folder.

Figure 4:
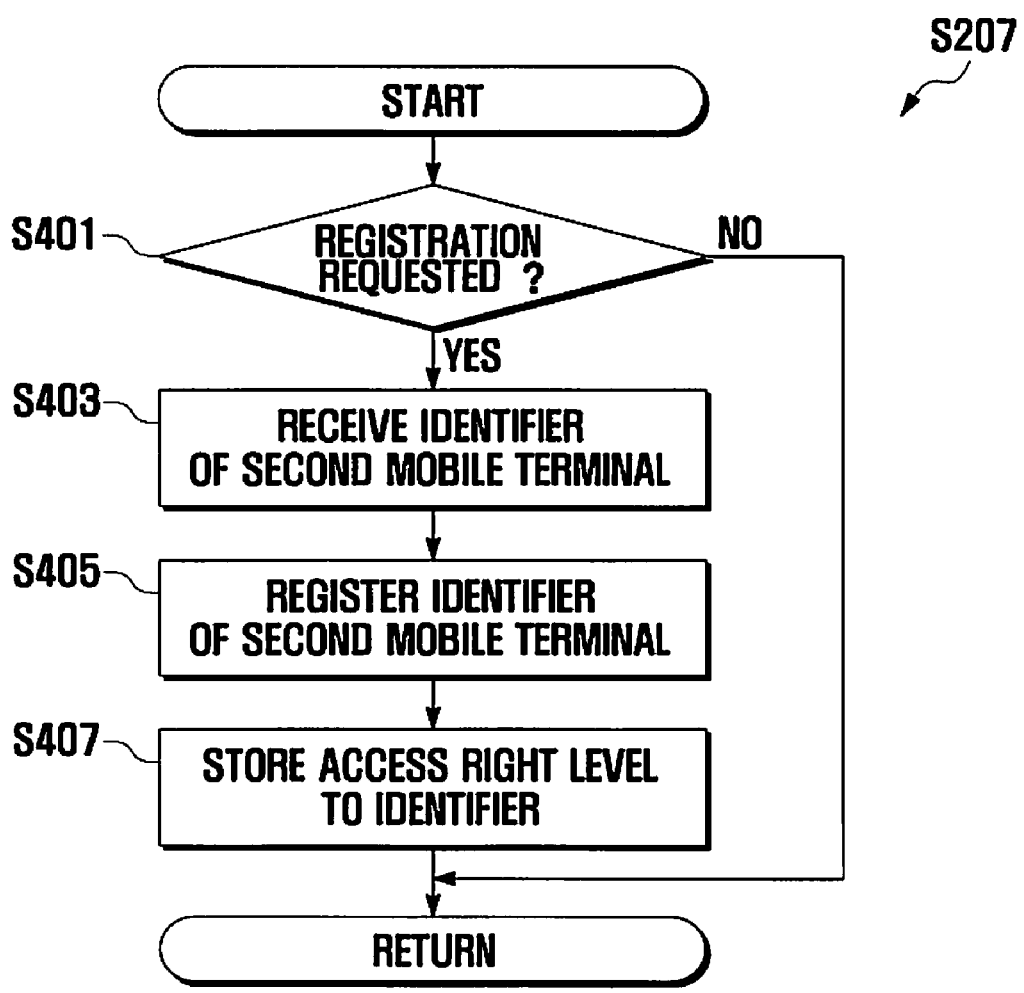
FIG. 4 is a flow chart of a detailed process of setting an access right level of a mobile terminal in the method of sharing information of FIG. 2.

FIG. 4 is a flow chart of a detailed process of setting an access rights level of a mobile terminal at step S207 of FIG. 2.

Referring to FIG. 4, the control unit 140 of the first mobile terminal identifies in step S401 if the registration of the second mobile terminal for the Bluetooth® communication is requested. If registration of the second mobile terminal for the Bluetooth® communication is requested, the first mobile terminal receives in step S403 a specific identifier of the second mobile terminal, specifies an access rights level for the second mobile terminal, registers in step S405 the received identifier as having the specified access right level of the second mobile terminal, and stores in step S407 the identifier and corresponding access right level. For example, access right levels of second mobile terminals C and D may be set to 'access rights level 1' and 'access rights level 2' respectively.

Figure 5:
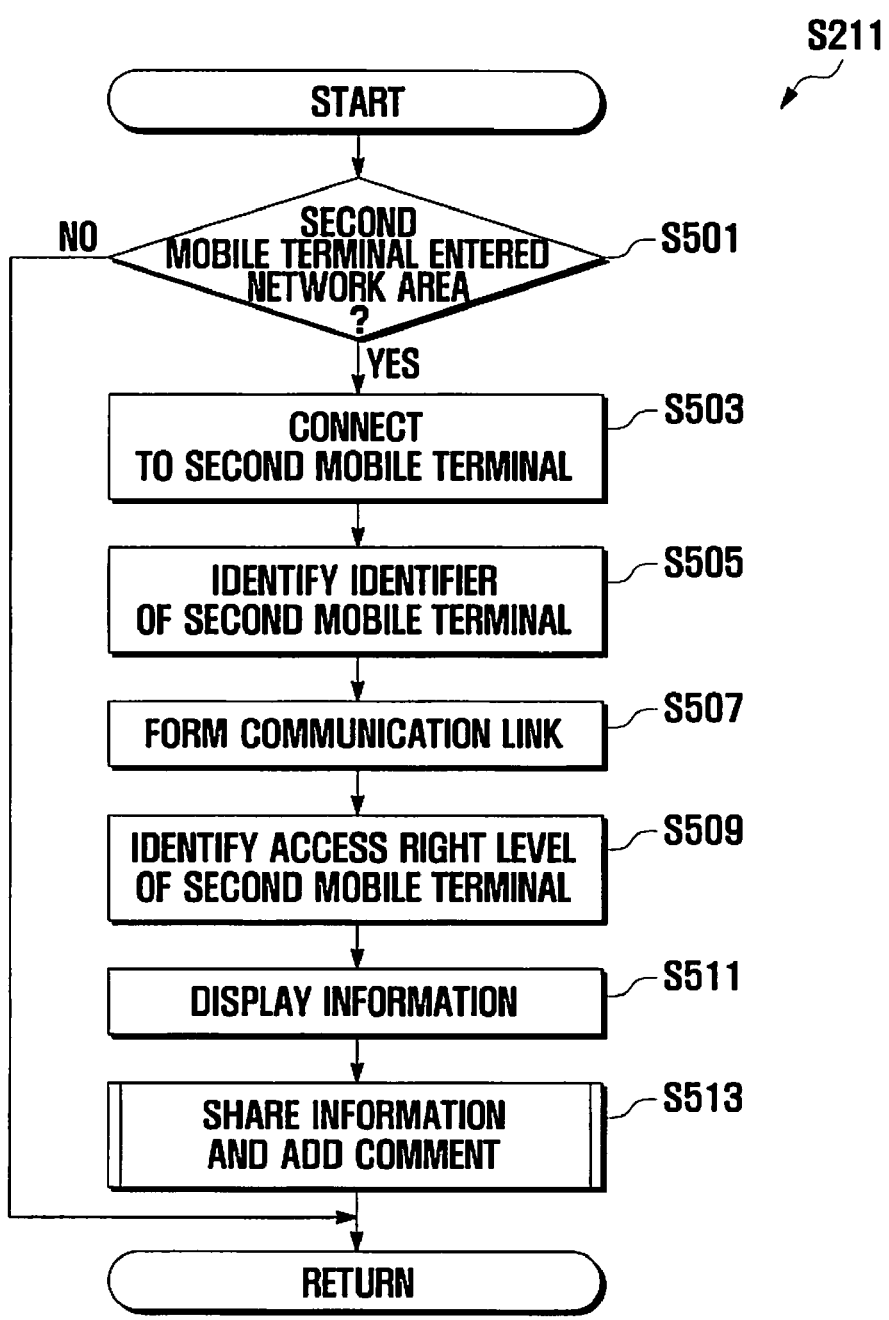
FIG. 5 is a flow chart of a detailed process of displaying a list of information in the method of sharing information of FIG. 2.

FIG. 5 is a flow chart of a detailed process of displaying a list of information at step S211 of FIG. 2.

Referring to FIG. 5, the control unit 140 of the first mobile terminal identifies in step S501 if a second mobile terminal has entered a Bluetooth® network area. If a second mobile terminal has entered the Bluetooth® network area, the control unit 140 of the first mobile terminal controls the short-range communication unit 130 to connect in step S503 the first mobile terminal to the second mobile terminal. If no second mobile terminal has entered the Bluetooth® communication area, the process returns to step S201 of FIG. 2.

The control unit 140 of the first mobile terminal then detects in step S505 an identifier of the second mobile terminal and controls the short-range communication unit 130 to form a communication link with the second mobile terminal in step S507.

The control unit 140 of the first mobile terminal identifies in step S509 an access right level corresponding to the identifier of the second mobile terminal, referring to the access rights level set at step S407 of FIG. 4, and displays in step S511 a list of information corresponding to the identified access rights level. The control unit 140 of the first mobile terminal then in step S513 shares information and adds a comment according to a request from the second mobile terminal.

Figure 6:
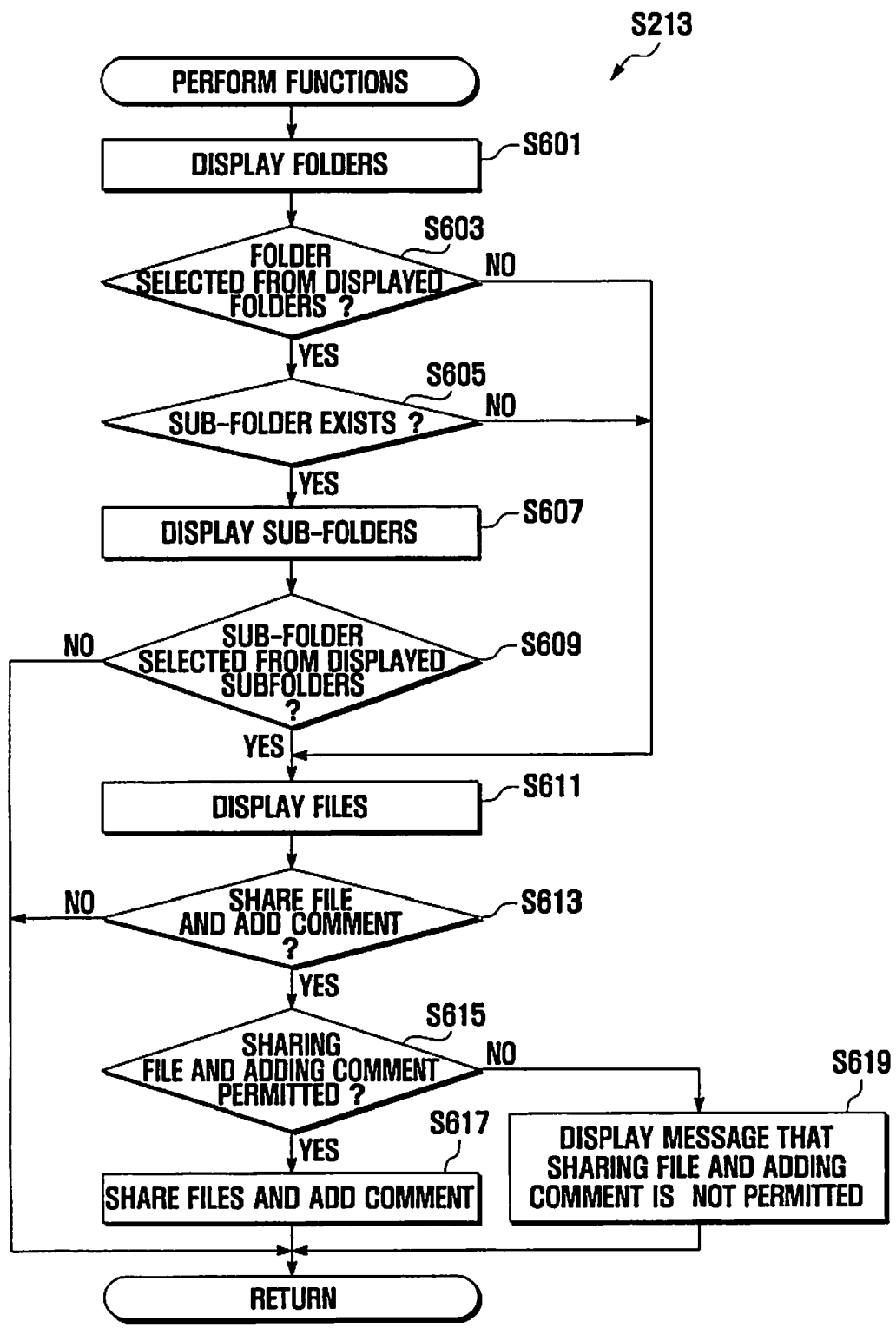
FIG. 6 is a flow chart of a detailed step of sharing information in the process of displaying a list of information of FIG. 5.

FIG. 6 is a flow chart of a detailed step of sharing information at step S513 of FIG. 5.

Referring to FIG. 6, the control unit 140 of the first mobile terminal controls in step S601 to display folders corresponding to the security level of information set at step S313 of FIG. 3 and corresponding to the access rights level set to the identifier of the second mobile terminal at step S407 of FIG. 4.

The control unit 140 then identifies in step S603 if a folder is selected from the displayed folders. If no folder is selected from the displayed folders, the process continues at step S611.

If a folder is selected from the displayed folder list, or if no sub-folder of the folder exists at step S605, the control unit 140 identifies in step S605 if a sub-folder of the folder exists.

If a sub-folder of the folder exists at step S605, the control unit 140 in step S607 controls to display sub-folders of the folder and identifies in step S609 if a sub-folder is selected from the displayed sub-folders by the second mobile terminal. If no sub-folder is selected from the displayed sub-folders, the process returns to step S201 of FIG. 2.

If a sub-folder is selected from the displayed sub-folders at step S609, or if no sub-folder of the folder exists at step S605, the control unit 140 in step S611 controls to display files included in the selected sub-folder or folder.

The control unit 140 of the first mobile terminal identifies in step S613 if at least one of sharing the displayed files and adding a comment to the displayed files is requested by the second mobile terminal. If neither sharing the displayed files nor adding a comment to the displayed files is requested, the process returns to step S201 of FIG. 2.

If at least one of sharing the displayed files and adding a comment to the displayed files is requested at step S613, the control unit 140 determines in step S615 whether to permit sharing the displayed files and adding a comment to the displayed files according to the security level of the files set at step S307 of FIG. 3.

If sharing the displayed files and adding a comment to the displayed files are not permitted, the control unit 140 in step S619 controls to display a message that sharing the files and adding a comment thereto is not permitted. If sharing the displayed files and adding a comment to the displayed files are permitted at step S615, the control unit 140 in step S617 shares information and adds a comment requested by the second mobile terminal. At this step, the control unit 140 transmits the requested folder and/or sub-folder to a path requested by the second mobile terminal.

Table 1 is prepared referring to the security levels of two files A and B set at step S313 of FIG. 3 and corresponding access rights levels of two second mobile terminals C and D set at step S407 of FIG. 4, and shows the possibilities of sharing a file and adding a comment. In Table 1, security level 1 is a higher security level than security level 2, and access rights level 1 corresponding to security level 1 is a higher access rights level than access rights level 2 corresponding to security level 2. The second mobile terminal C set with access rights level 1 may share both files A and B and may add a comment to the files A and B. However, the first mobile terminal does not transmit the file A to the second mobile terminal D set with access rights level 2, and the second mobile terminal D may thereby not access the file A.

TABLE 1

| File | Second mobile terminal | |
|---|---|---|
| | C: Access right level 1 | D: Access right level 2 |
| A: Security level 1 | Sharing file and adding comment permitted | Sharing file and adding comment not permitted |
| B: Security level 2 | Sharing file and adding comment permitted | Sharing file and adding comment permitted |

The files displayed at step S611 are ordered according to the time at which the files were uploaded. However, the files may be re-ordered by the kinds of files, sizes of files, times of repeated sharing, and numbers of comments added to the files, etc.

As described above, the present invention may reduce the time required for sharing information stored in a mobile terminal with another mobile terminal and restriction of location in sharing information.

Additionally, the present invention sets an access rights level of each mobile terminal, and may thereby protect against an unauthorized access by an unintended person. Further, the present invention may prevent the access to a specific file by setting a security level of the file.

Although exemplary embodiments of the present invention have been described in detail hereinabove, it should be understood that many variations and modifications of the basic inventive concept herein described, which may appear to those skilled in the art, will still fall within the spirit and scope of the exemplary embodiments of the present invention as defined in the appended claims.

What is claimed is:

1. A method of sharing information in a mobile terminal using local wireless communication, comprising:
    setting a security level of information stored in a first mobile terminal with one of at least two security levels;
    when registration is requested by a second mobile terminal, registering an identifier of the second mobile terminal and an access rights level of the second mobile terminal to the information set with the one of at least two security levels;
    when a local wireless communication link is formed with the second mobile terminal, displaying a list of information set with a set security level corresponding to the access rights level of the second mobile terminal; and
    sharing the displayed information according to a request from the second mobile terminal,
    wherein the information is displayed in an order of the time at which the information was uploaded and is re-ordered according to at least one of a type of data, a size of the data, a repeated times of sharing the data, and a number of comments added to the data.

2. The method of claim 1, wherein the information includes at least one of a folder and a file stored in the first mobile terminal.

3. The method of claim 2, wherein the information is displayed in an order of a time at which the information was uploaded, beginning with the most recently uploaded information.

4. The method of claim 2, wherein the information includes at least one of moving image data, still image data, multimedia data including music, and character data.

5. The method of claim 2, further comprising preparing and adding a comment to the displayed information according to the security level of the information.

6. The method of claim 1, wherein the step of setting one of at least two security levels to information stored in a first mobile terminal comprises setting a folder with one of at least two security levels and storing the setting.

7. The method of claim 6, wherein the folder includes a sub-folder.

8. The method of claim 7, wherein the step of setting one of at least two security levels to information stored in a first mobile terminal further comprises setting the sub-folder with one of at least two security levels and storing the setting.

9. The method of claim 1, wherein the step of registering an identifier of the second mobile terminal comprises:
   receiving from the second mobile terminal a registration request;
   receiving an identifier of the second mobile terminal;
   registering the received identifier; and
   registering the registered identifier as an access rights level to the information set with the one of at least two security levels.

10. The method of claim 1, wherein displaying a list of information comprises:
   identifying if the second mobile terminal has entered a local wireless communication area;
   when the second mobile terminal has entered a local wireless communication area, connecting to the second mobile terminal;
   identifying an identifier of the second mobile terminal;
   forming a local wireless communication link with the second mobile terminal having the identified identifier;
   identifying an access rights level of the identified identifier;
   displaying information according to the identified access rights level; and
   sharing information and adding a comment requested by the second mobile terminal.

11. The method of claim 1, wherein the step of sharing the displayed information comprises:
   receiving from the second mobile terminal a request for sharing the displayed information;
   identifying the one of at least two security levels of the displayed information;
   identifying if the security level of the displayed information permits sharing the displayed information with the second mobile terminal; and
   when the security level of the displayed information permits sharing the displayed information, sharing the displayed information.

12. A method of sharing information in a mobile terminal using local wireless communication, comprising:
   forming a local wireless communication link between a first mobile terminal and a second mobile terminal;
   transmitting an identifier of the second mobile terminal to the first mobile terminal;
   identifying a registered access rights level of the second mobile terminal corresponding to the transmitted identifier;
   transmitting a list of information from the first mobile terminal to the second mobile terminal corresponding to the access rights level of the second mobile terminal registered in the first mobile terminal, wherein a security level of information is set to one of at least two security levels;
   displaying the transmitted list of information in the second mobile terminal; and
   sharing information displayed in the list between the first mobile terminal and the second mobile terminal according to a request from the second mobile terminal,
   wherein the information is displayed in an order of the time at which the information was uploaded and is re-ordered according to at least one of a type of data, a size of the data, a repeated times of sharing the data, and a number of comments added to the data.

13. The method of claim 12, wherein the step of displaying the transmitted list of information comprises:
   sharing a list of information of the first mobile terminal with the second mobile terminal corresponding to the identified access rights level of the second mobile terminal; and
   displaying the shared list of information of the first mobile terminal in the second mobile terminal.

14. The method of claim 12, further comprising:
   requesting, by the second mobile terminal, sharing information from the displayed list of information;
   identifying, by the first mobile terminal, a preset security level of the requested information;
   determining, by the first mobile terminal, when sharing the requested is permitted;
   sharing the information requested by the second mobile terminal according to the result of the determination.

15. The method of claim 14, wherein the information includes a folder, a sub-folder, and a file stored in the first mobile terminal.

16. The method of claim 15, wherein the file includes at least one of moving image data, still image data, multimedia data including music, and character data.

17. The method of claim 15, wherein the second mobile terminal prepares and adds a comment to the shared information stored in the first mobile terminal.

18. A method of sharing information in a mobile terminal using local wireless communication, comprising:
   setting a security level of information stored in a first mobile terminal with one of at least two security levels;
   when registration is requested by a second mobile terminal, registering an identifier of the second mobile terminal and an access rights level of the second mobile terminal to the information set with the one of at least two security levels;
   when a local wireless communication link is formed with the second mobile terminal, displaying a list of information set with a set security level corresponding to the access rights level of the second mobile terminal; and
   sharing the displayed information according to a request from the second mobile terminal,
   wherein the information is displayed in an order of time at which the information was uploaded and is re-ordered according to a number of comments added to the data.

* * * * *